Figure 1:
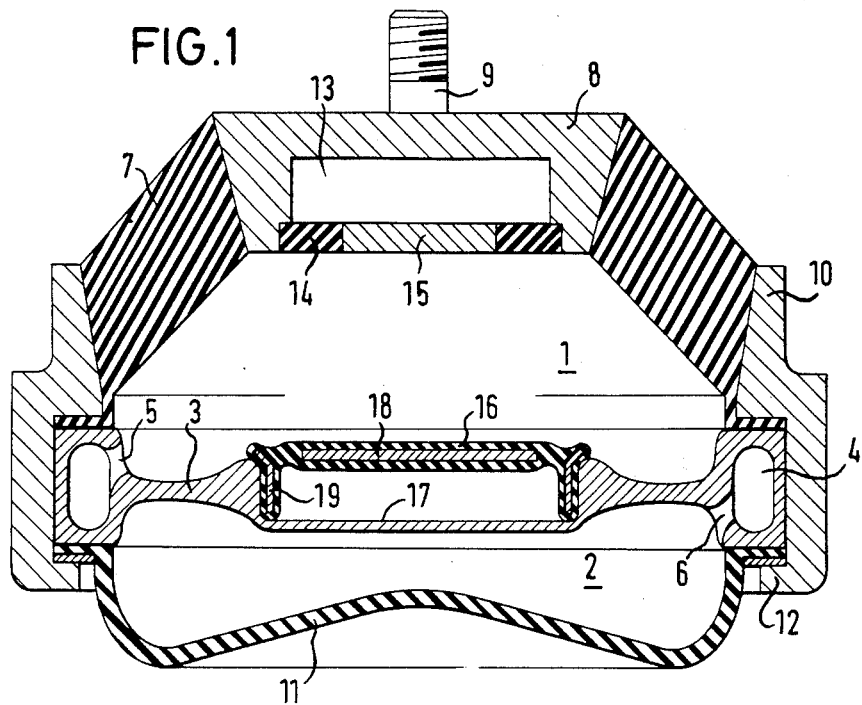

United States Patent [19]
Andrä et al.

[11] Patent Number: 4,721,288
[45] Date of Patent: Jan. 26, 1988

[54] TWO-CHAMBER ENGINE MOUNT WITH HYDRAULIC DAMPING

[75] Inventors: Rainer Andrä, Limburg; Manfred Hofmann, Hünfelden, both of Fed. Rep. of Germany

[73] Assignee: Metzeler Kautschuk GmbH, Munich, Fed. Rep. of Germany

[21] Appl. No.: 742,293

[22] Filed: Jun. 7, 1985

[30] Foreign Application Priority Data

Jun. 6, 1984 [DE] Fed. Rep. of Germany ....... 3421119

[51] Int. Cl.$^4$ ............... B60G 15/04; F16F 15/04; F16F 7/10; F16M 13/00
[52] U.S. Cl. ................................... 267/219; 188/379; 248/562; 267/140.1
[58] Field of Search ............. 267/8 R, 35, 113, 63 R, 267/64.23, 64.27, 136, 140.1, 140.3, 140.4; 188/298, 379; 248/559, 562, 636, 638, 659; 180/300, 312

[56] References Cited

U.S. PATENT DOCUMENTS

4,595,183  6/1986  Dan et al. .................... 267/140.1

FOREIGN PATENT DOCUMENTS

0027751  4/1981  European Pat. Off. .
0110197  6/1984  European Pat. Off. ......... 267/140.1
0115417  8/1984  European Pat. Off. ......... 267/140.1
2906282  8/1980  Fed. Rep. of Germany ... 267/140.1
3142673  5/1983  Fed. Rep. of Germany ... 267/140.1
0066539  6/1981  Japan .............................. 267/140.1
58196341 11/1983  Japan .............................. 267/140.1
2041485  9/1980  United Kingdom ............... 267/8 R Primary Examiner—Andres Kashnikow
Assistant Examiner—Robert J. Oberleitner
Attorney, Agent, or Firm—Herbert L. Lerner; Laurence A. Greenberg

[57] ABSTRACT

A two-chamber engine mount with hydraulic damping includes an engine side to be connected to an engine, fluid-filled chambers having rubber-elastic peripheral walls including a chamber disposed closer to the engine side, an intermediate plate disposed between the chambers having a conduit disposed therein through which the chambers are interconnected, an engine support plate at the engine side having a first membrane chamber formed therein, a first membrane closing off the first membrane chamber, the intermediate plate having a second central membrane chamber formed therein, and a second membrane closing off the second membrane chamber from the fluid-filled chamber to the engine side.

7 Claims, 2 Drawing Figures

U.S. Patent    Jan. 26, 1988    4,721,288

TWO-CHAMBER ENGINE MOUNT WITH HYDRAULIC DAMPING

The invention relates to a two-chamber engine mount or motor support with hydraulic damping, especially for motor vehicles, having fluid-filled chambers with rubber-elastic peripheral walls connected with each other by a conduit passing through an intermediate plate, and an engine-side support plate having a membrane chamber provided therein, which is closed by a membrane. Engine mounts of this type are known from German Published, Non-Prosecuted Application DE-OS No. 32 44 295. The membrane inserted into the motor support plate may be additionally provided with a central quenching mass, and may be acted upon by the full fluid pressure within the chamber. In this case, the membrane also vibrates, due to the vibrations applied to the engine mount. The vibration occurs in dependence on geometry, stiffness and the mass of the membrane. If the membrane with its quenching mass vibrates in the opposite phase to the excitation, i.e. to the fluid mass in the chamber, complete hydraulic de-coupling is achieved and the acoustic behavior of the engine mount is considerably improved. However, due to the predetermined characteristic parameters of the membrane, the desired de-coupling of the frequency occurs only over a relative narrow band width.

It is known, for example, from European Patent EP-PS No. 0 027 751 to place the membrane centrally in a rigid intermediate plate, instead of in the engine support plate and to clamp it only at its rim, so that it can freely move up and down and in some cases is limited by stops. This structure causes the same effect of narrow band frequency de-coupling, but it has the disadvantage that the membrane is exposed to the full chamber pressure, so that its life expectancy is often not satisfactory.

It is accordingly an object of the invention to provide a two-chamber engine mount with hydraulic damping, which overcomes the hereinafore-mentioned disadvantages of the heretofore-known defices of this general type, which permits frequency de-coupling over a wider band and therefore a lowering of the dynamic stiffness, and which greatly reduces the load on the membrane caused by the chamber pressure.

With the foregoing and other objects in view there is provided, in accordance with the invention, a two-chamber engine mount with hydraulic damping, especially for motor vehicle, comprising an engine side or end to be connected to an engine, fluid-filled chambers having rubber-elastic peripheral walls including a chamber disposed closer to the engine side, an intermediate plate disposed between the chambers having a conduit disposed therein through which the chambers are interconnected, an engine support plate at the engine side having a first membrane chamber formed or embedded therein, a first membrane closing off the first membrane chamber, the intermediate plate having a second central membrane chamber formed therein, and a second membrane closing off the second membrane chamber from the fluid-filled chamber closer to the engine side.

The placement of a second membrane of this kind in the active region of the support chamber at the engine side, with a geometry and mass generally different from the membrane in the engine support plate, make a considerably wider frequency band de-coupling possible.

In accordance with another feature of the invention, there is provided a gas filling the second membrane chamber. By placing a membrane chamber with a certain gas (counter) pressure behind the membrane in the intermediate plate, the membrane itself is not under pressure, so that its life expectancy is increased and problems with respect to life expectancy are avoided.

In accordance with an additional feature of the invention, the intermediate plate has an upper surface, the second membrane chamber is a cylindrical recess formed in the upper surface of the intermediate plate defining a rim of the intermediate plate at the recess and an open side of the recess, and the second membrane closes off the open side and is sealingly connected to the rim of the intermediate plate. This membrane therefore can have a cylindrical metal ring vulcanized to its outer periphery, which is inserted as a clamping ring into the cylindrical recess of the intermediate plate, and thereby clamps and seals the membrane.

In accordance with an added feature of the invention, there is provided a cylindrical metal ring vulcanized to the outer periphery of the second membrane, the cylindrical metal ring being inserted into the cylindrical recess formed in the intermediate plate as a clamping ring.

In accordance with a further feature of the invention, there is provided a metallic ring disposed outside and connected to the cylindrical ring, the metallic ring having a substantially U-shaped cross section with free outwardly extending legs, the legs surrounding and sealing the annular intermediate plate part, and the conduit being in the form of grooves formed in the plate part and being open toward the inside of the plate part.

In accordance with a concomitant feature of the invention, there is provided a rigid central quenching mass disposed in the second membrane.

Other features which are considered as characteristic for the invention are set forth in the appended claims.

Although the invention is illustrated and described herein as embodied in a two-chamber engine mount with hydraulic damping, it is nevertheless not intended to be limited to the details shown, since various modifications and structural changes may be made therein without departing from the spirit of the invention and within the scope and range of equivalents of the claims.

Figure 2:
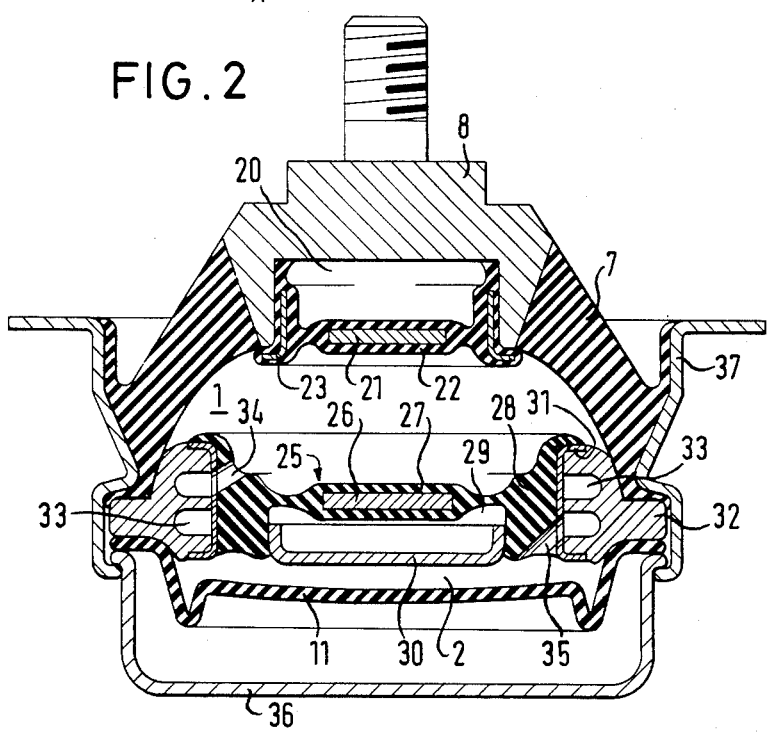

The construction and method of operation of the invention, however, together with additional objects and advantages thereof will be best understood from the following description of specific embodiments when read in connection with the accompanying drawings, in which:

FIG. 1 is a diagrammatic, longitudinal-sectional view of a two-chamber engine mount or motor-support, with a membrane chamber disposed in an intermediate plate; and FIG. 2 is a longitudinal-sectional view of an additional embodiment of the engine mount with a membrane chamber which is formed of the membrane material itself.

Referring now to the figure of the drawings in detail, it is seen that the two-chamber engine mount is essentially formed of an upper chamber 1 at the motor side of the engine mount and a lower chamber 2, both of which are filled with hydraulic fluid. The two chambers are in communication with each other through a ring channel 4 which is disposed at the outer periphery of an intermediate plate 3. The ring channel 4 has an opening 5 leading to the upper chamber 1 and an opening 6 leading to the lower chamber 2. The upper chamber 1 is formed by a strong-walled, hollow conical chamber wall 7 made of rubber-elastic material. The chamber wall 7 is closed at the upper end thereof by an engine or motor support plate 8 with an attached threaded stud 9. The lower end of the chamber wall 7 is permanently connected to an annular counter support 10. The lower chamber 2 is formed by a saucer-shaped chamber wall 11, which is also made of a rubber-elastic material and is clamped and sealed against the intermediate plate 3 by the lower flanged or rolled over end 12 of the counter support 10. Furthermore, the bottom of the engine support plate has a cylindrical cavity or hollow space 13 formed therein, which is closed off from the upper chamber 1 by annular rubber membrane 14 with a central quenching mass 15. The cavity 13 which acts as a membrane chamber, is closed off from the outside and is filled with a gas or a low density liquid. The membrane chamber 13 can therefore be at atmospheric pressure, or it can have a higher pressure for a suitable damping effect.

In order to provide an additional membrane 16, the top of the expanded middle part of the intermediate plate 3 is provided with a cylindrical recess 17, the open side of which is closed by the membrane 16, which also may include a quenching mass 18. A metal ring 19 is vulcanized to the outer periphery of the membrane 16. The end of the metal ring 19 toward the membrane 16 has a flange or rolled over portion bent toward the outside and is inserted as a clamping and holding ring into the cylindrical recess 17 of the intermediate plate 3, where it holds and seals the membrane in the intermediate plate 3.

As is known, in engine mounts of this type, most damping action occurs only at low frequencies up to about 30 Hz, and at larger amplitudes, i.e. if a fluid exchange through the ring channel 4 between the two chambers 1 and 2 takes place. In the high frequency range above 30 Hz, there is very little damping, so that in this range the requirement for optimal sound isolation with corresponding low dynamic stiffness is dominant. The placement of only one membrane within the upper chamber provides frequency de-coupling required for sound isolation by causing vibrations of the membrane with its quenching mass in counter-phase to the fluid mass in the chamber 1, but the de-coupling is only obtained for a very narrow frequency band, since the geometry, stiffness and mass of the membrane and quenching mass determine the frequency range. However, if an additional membrane with or without a quenching mass is provided within the effective region of the chamber disposed at the engine side, which has different geometry, stiffness and mass, and if it is suitably tuned to the values of the first membrane, a considerably broad band de-coupling of the frequencies becomes possible.

Beyond this, since the second membrane 16 is acted upon by the gas pressure of the membrane chamber 17 at the side thereof facing toward the chamber 17, counter-pressure is generated against the pressure in the chamber 1, taking the load off the membrane, which thereby exhibits greater creep strength depending on time.

A further embodiment is shown in the longitudinal-sectional view according to FIG. 2. In this case, a membrane 22, which closes the upper membrane chamber 20, surrounds a circular disk-shaped quenching mass 21, and is clamped against the outer wall of the membrane chamber 20 by a clamping ring 23 which is vulcanized into the membrane.

In this embodiment, an intermediate plate 25 is provided which is made of several parts, that will be described in sequence below from the inside outward. Adjacent a membrane 27, which encloses a quenching mass 26, is a cylindrical ring 28 which is made of the same material as the membrane 27. The ring 28 surrounds the actual membrane chamber 29 like a ring. A pot or cup-shaped bottom part 30, made of metal or plastic, is tightly sealingly inserted into the cylindrical membrane chamber 29, which is enclosed by the ring 28, so that the membrane chamber 29 is closed on all sides thereof.

A metal ring 31 with a substantially U-shaped cross section, is vulcanized to the outer periphery of the ring 28. The outwardly extending free legs of the ring 31 surround an annular intermediate plate part 32 having a spiral-shaped connection line 33, thereby sealing these respective parts. More specifically, the intermediate plate part 32 is provided with a groove forming the connection line 33 at the inner surface thereof, which is open at the inner surface with one or more turns of a spiral. The groove 33 is in communication with the chamber 1 at the engine side through a channel 34, and it is in communication with the lower chamber 2 through a connection line 35. In this case as well, the intermediate plate part 32, the lower chamber wall 1 and an additional cup or pot-shaped metallic bottom part 36, are clamped to each other and sealed by a flanged or rolled ober edge of a counter support 37.

The engine mount according to the embodiment shown in FIG. 2 operates on the same principle as the embodiment shown in FIG. 1, and also provides a broad band de-coupling of the frequency.

We claim:

1. Two-chamber engine mount with hydraulic damping, comprising an engine side to be connected to an engine, fluid-filled chambers having rubber-elastic peripheral walls including a chamber disposed closer to said engine side, an intermediate plate disposed between said chambers having a conduit disposed therein through which said chambers are interconnected, said intermediate plate having an upper surface, an engine support plate at said engine side having a first membrane chamber formed therein, a first membrane closing off said first membrane chamber from said fluid-filled chamber closer to said engine side, said intermediate plate having a second central membrane chamber formed therein in the form of a cylindrical recess formed in said upper surface of said intermediate plate defining a rim of said intermediate plate at said recess and an open side of said recess, and a second membrane closing off said open side from said fluid-filled chamber closer to said engine side and being sealingly connected to said rim of said intermediate plate.

2. Two-chamber engine mount according to claim 1, including a gas filling said second membrane chamber.

3. Two-chamber engine mount according to claim 1, including a cylindrical metal ring vulcanized to the outer periphery of said second membrane, said cylindrical metal ring being inserted into said cylindrical recess formed in said intermediate plate as a clamping ring.

4. Two-chamber engine mount with hydraulic damping, comprising an engine side to be connected to an engine, fluid-filled chambers having rubber-elastic peripheral walls including a chamber disposed closer to said engine side, an intermediate plate disposed between said chambers having a conduit disposed therein through which said chambers are interconnected, an engine support plate at said engine side having a first membrane chamber formed therein, a first membrane closing off said first membrane chamber from said fluid-filled chamber closer to said engine side, said intermediate plate having a second central membrane chamber formed therein, a second membrane closing off said second membrane chamber from said fluid-filled chamber closer to said engine side, said second membrance having an upper portion, a substantially hollow, cylindrical ring integral with said second membrane and forming a lateral limit of said second membrane chamber at said upper portion of said second membrane, a cup-shaped rigid bottom part inserted into said cylindrical ring and forming a lower limit of said second membrane chamber, and an annular intermediate plate part disposed outside said cylindrical ring, said plate part having said conduit disposed therein interconnecting said fluid-filled chambers.

5. Two-chamber engine mount according to claim 4, including a metallic ring disposed outside and connected to said cylindrical ring, said metallic ring having a substantially U-shaped cross section with free outwardly extending legs, said legs surrounding and sealing said annular intermediate plate part, and said conduit being in the form of grooves formed in said plate part and being open toward the inside of said plate part.

6. Two-chamber engine mount according to claim 1, including a rigid central quenching mass disposed in said second membrane.

7. Two-chamber engine mount according to claim 4, including a rigid central quenching mass disposed in said second membrane.

* * * * *